US012001982B2

United States Patent
von Löbbecke

(10) Patent No.: US 12,001,982 B2
(45) Date of Patent: Jun. 4, 2024

(54) SYSTEM AND METHOD FOR CONTROLLING A CLOUD-BASED AGRICULTURAL DATABASE SYSTEM

(71) Applicant: 365FarmNet Group KGaA mbH & Co. KG, Harsewinkel (DE)

(72) Inventor: Maximilian von Löbbecke, Berlin (DE)

(73) Assignee: 365FarmNet Group KGaA mbH & Co. KG, Harsewinkel (DE)

( * ) Notice: Subject to any disclaimer, the term of this patent is extended or adjusted under 35 U.S.C. 154(b) by 0 days.

(21) Appl. No.: 17/541,897

(22) Filed: Dec. 3, 2021

(65) Prior Publication Data
US 2022/0180272 A1     Jun. 9, 2022

(30) Foreign Application Priority Data
Dec. 4, 2020   (DE) .......................... 102020132332.8

(51) Int. Cl.
| G06Q 10/06 | (2023.01) |
| G05B 15/02 | (2006.01) |
| G06Q 10/0631 | (2023.01) |
| G06Q 50/02 | (2012.01) |

(52) U.S. Cl.
CPC ....... *G06Q 10/06313* (2013.01); *G05B 15/02* (2013.01); *G06Q 50/02* (2013.01)

(58) Field of Classification Search
None
See application file for complete search history.

(56) References Cited

U.S. PATENT DOCUMENTS

| 9,706,697 B2 | 7/2017 | Wilkening et al. |
| 11,083,135 B2 | 8/2021 | Neitemeier et al. |
| 11,122,739 B2 | 9/2021 | Heitmann |

(Continued)

FOREIGN PATENT DOCUMENTS

| DE | 202018106667 U1 | 2/2019 |
| EP | 3064050 A1 | 9/2016 |
| WO | 2016154482 A1 | 9/2016 |

OTHER PUBLICATIONS

Achillas et al. (Ch. Achillas, D. Bochtis, D. Aidonis, V. Marinoudi, D. Folinas, Voice-driven fleet management system for agricultural operations, Information Processing in Agriculture, vol. 6, Issue 4, 2019, pp. 471-478, ISSN 2214-3173, https://doi.org/10.1016/j.inpa.2019.03.001.).*

*Primary Examiner* — Matthew D Henry
(74) *Attorney, Agent, or Firm* — Lempia Summerfield Katz LLC

(57) ABSTRACT

A method and system for controlling a cloud-based agricultural database system using a control system is disclosed. The control system includes a local voice input unit, wherein a user performs an agricultural activity, such as with an agricultural work machine in an agricultural environment. The agricultural activity, the user and the agricultural environment may be embedded in or associated with an agricultural context, with state data and/or planning data depicting the agricultural context being saved in an agricultural database system. The user may process, such as supplement, the state data and/or planning data while performing the agricultural activity by voice input via the local voice input unit.

20 Claims, 1 Drawing Sheet

(56) References Cited

U.S. PATENT DOCUMENTS

| | | | |
|---|---|---|---|
| 2012/0101861 A1* | 4/2012 | Lindores | A01B 79/005 705/7.11 |
| 2014/0012732 A1* | 1/2014 | Lindores | A01B 79/005 705/37 |
| 2018/0014452 A1 | 1/2018 | Starr | |
| 2020/0365153 A1* | 11/2020 | Aquino | G10L 15/26 |
| 2022/0180272 A1* | 6/2022 | von Löbbecke | G06Q 50/02 |

* cited by examiner

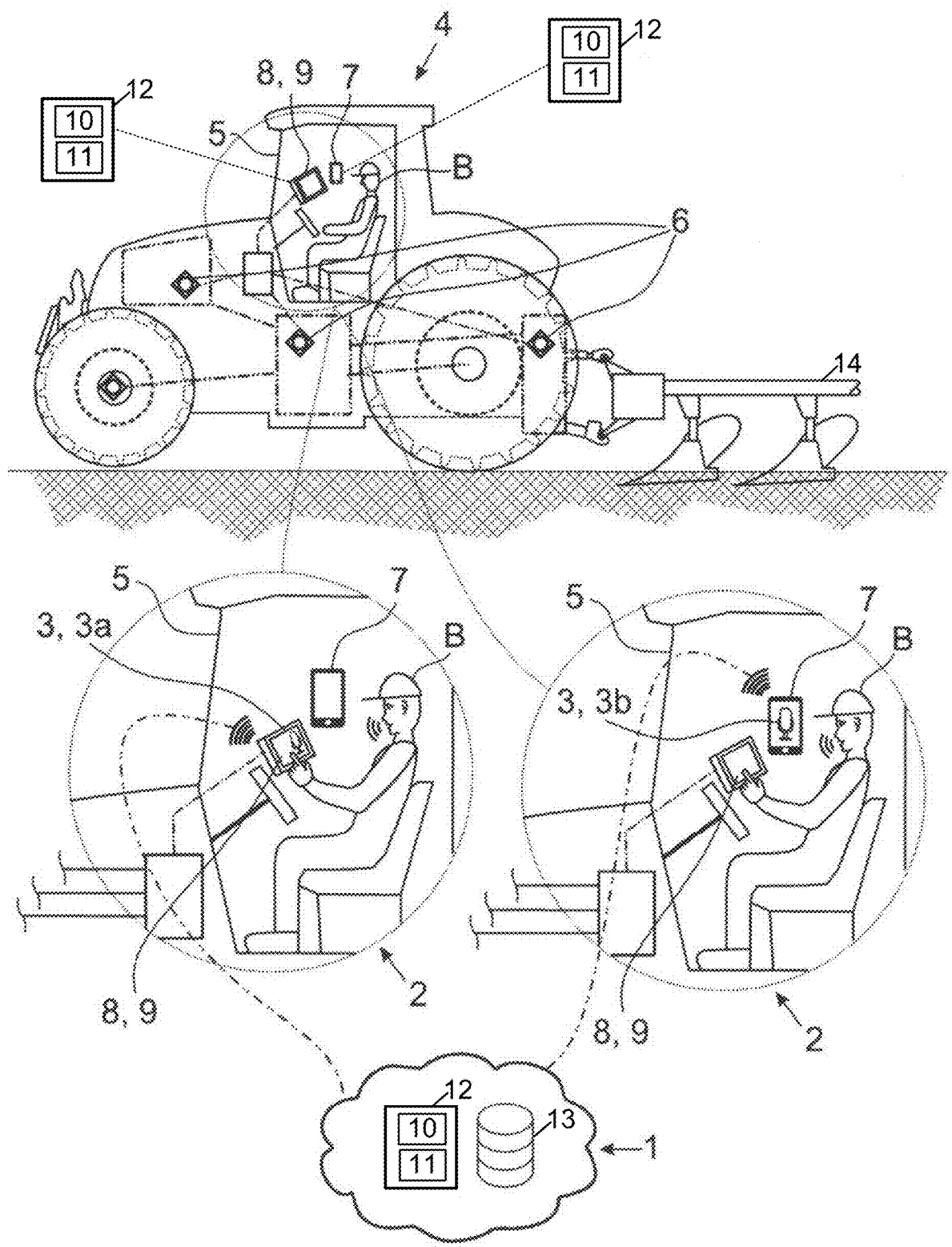

SYSTEM AND METHOD FOR CONTROLLING A CLOUD-BASED AGRICULTURAL DATABASE SYSTEM

CROSS REFERENCE TO RELATED APPLICATION

This application claims priority under 35 U.S.C. § 119 to German Patent Application No. DE 102020132332.8 filed Dec. 4, 2020, the entire disclosure of which is hereby incorporated by reference herein.

TECHNICAL FIELD

The invention relates to a system and method for controlling a cloud-based agricultural database system, including a method and one or more apparatuses associated therewith including a voice input unit, an agricultural work machine, a computer program product, a control system, and an agricultural database system.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Cloud-based database systems are increasingly being used in agriculture. They serve to collect and compile data from a wide variety of origins, such as machine data, weather data, field data, operating data, planning data and state data of an agricultural business. These database systems may assume control of functions from the machine control to job accounting. The database system normally depicts an agricultural context such as an agricultural business or similar economic entity.

DE 102 06 044 A1 discloses using voice input to control the agricultural work machine using onboard work computers of agricultural work machines. Similarly, DE 102 17 398 B4 discloses using a mobile terminal to control an agricultural work machine. However, technical support for organizational processes is not offered in this way.

DESCRIPTION OF THE DRAWING

The present application is further described in the detailed description which follows, in reference to the noted drawings by way of non-limiting examples of exemplary implementation, in which like reference numerals represent similar parts throughout the several views of the drawings, and wherein:

FIG. 1 illustrates the execution of the disclosed method while performing an agricultural activity with an agricultural work machine.

DETAILED DESCRIPTION

As discussed in the background, the prior art discloses using voice input to control the agricultural work machine using onboard work computers of agricultural work machines and using a mobile terminal to control an agricultural work machine. However, the prior art generally fails to provide technical support for organizational processes.

In one or some embodiments, the focus may be on processing of state data and/or planning data. This data may relate to the planning and documentation of work processes, billing processes, etc. In particular, the state data or the planning data are indicative of an agricultural context, wherein a user performs an agricultural activity with an agricultural work machine in an agricultural environment, with the agricultural activity, the user, and the agricultural environment are embedded in the agricultural context. Various agricultural activities are contemplated, including any one, any combination, or all of: reaping; threshing; gathering; and winnowing. Generally speaking, these may comprise matters relating to the organization of an agricultural business. Until now, these matters were frequently done separately from the rest of the agricultural work at a great deal of time and effort, particularly in the evening. This process was partially based on the memories of the user or the operator and was generally not efficient.

In one or some embodiments, a method and system are disclosed that allows a cloud-based agricultural database system to be controlled with greater integration in the agricultural processes. In particular, extensive use of mobile terminals and/or user terminals installed in agricultural work machines may be very distracting. In contrast, many agricultural activities exist that may give a user or operator of the agricultural work machines the freedom to simultaneously perform a range of organizational planning steps, etc. In one or some embodiments, a local voice input unit enables data input (which may be performed during an agricultural activity) in order to process state data and/or planning data of a cloud-based agricultural database system. Such a local voice input unit, coupled with the typical freedom afforded the operator to multi-task during the agricultural activity, allows for input (such as for documentary purposes) at (or nearly at) the same time to the actual process in a safe manner Thus, at least partly (such as concurrently) while an agricultural activity is being performed by voice input, it is possible to use an indirect system that directly affects the controlling of the agricultural work machines.

Accordingly, is possible to postpone organizational processes to time periods that are actually assigned to the performance of another agriculture activity.

In particular, it is contemplated that the user processes (e.g., supplements, such as adds and/or amends) the state data and/or planning data by voice input via the local voice input unit while performing the agricultural activity.

In one or some embodiments, a semantic module is used to translate voice commands spoken as voice input. This semantic module is selected or generated based on the state data and/or planning data. One problem is to render human speech that is understandable to or able to be processed by a machine. Using an adapted semantic module, the amount of possible meanings of the voice commands is significantly reduced, which increases the probability of a correct translation of the control commands Since the quality of the voice input, such as with respect to background noise, etc., may vary strongly especially in the agricultural sector, such a reduction of the possible meanings of the voice input yields a more robust method.

In one or some embodiments, the method includes performing an agricultural activity using an agricultural work machine. This agricultural activity is an attractive time in which to input data (via the voice input unit that may be configured in or attached to a part of the driver's cab of the agricultural work machine) because of a useful database for documentation purposes, a great deal of freely available time including for planning purposes, and a well-defined environment for voice input.

In one or some embodiments, the planning data may relate to any one, any combination, or all of: agricultural resources (such as inventory and/or agricultural equipment (e.g., agricultural work machines); agricultural employees; agricultural fields; job assignments; job orders (e.g., the user B processes job assignments and/or orders, such as creates or changes them). In one or some embodiments, there is a distinction between planning and control data, which may yield a simplification of otherwise complex controlling.

In one or some embodiments, the state data may relate to any one or both of: states of the agricultural resources; or progress of plans from the planning data. The state data may include documentation, such as the progress of executing a plan from the planning data, or modifying the state data. In one or some embodiments, the user (B) processes, such as modifies, the documentation (thereby comprising updated or modified state data).

In one or some embodiments, the control system automatically collects measurement data relating to the agricultural environment and transfers it as state data to the agricultural database system. This relieves the user of providing manual input. Moreover, this makes it possible to choose or generate the semantic module based on the measurement data and thereby improve speech processing depending on the context. In particular, the control system may select or generate the semantic model based on the measurement data. In one or some embodiments, the measurement data comprises any one, any combination, or all of: GPS data from a smartphone; GPS data from the agricultural work machine; or the state data of the agricultural work machine relating to the agricultural activity.

In one or some embodiments, the times at which the state data and/or planning data are processed may depend on one or both of past processings or on the state data and/or planning data itself (e.g., on the current state of the agricultural context and/or the agricultural environment itself). This may therefore make it possible to determine the probable or even possible processings of the state data and/or planning data, and to select or generate the semantic model such that only a very limited number of possible meanings is available for the voice input. In turn, speech processing may correspondingly be very robust. In particular, the control system may be configured to determine the potential and/or probable processings of the state data and/or planning data from the state data and/or planning data, and/or previous processings of the state data and/or planning data, and configured to select or generate the semantic model based on the potential and/or probable processings.

In one or some embodiments, in order to simplifying speech processing and/or the voice input procedure, a fixed structure is specified in the form of forms that the user processes while performing the agricultural activity. In particular, the state data and/or planning data may include forms with a set structure, and the user may process the forms, such as filling out new forms by voice input through the local voice input unit while or simultaneous to performing the agricultural activity. In one or some embodiments, the agricultural control system may select or generate the semantic model based on the set structure.

In one or some embodiments, certain hardware may be used for the control system. In particular, a smartphone may be used as the voice input unit, and a terminal of the agricultural work machine as the output unit (with the terminal optionally including a communication interface in order to communicate wirelessly with the agricultural database system). On the one hand, smartphones are frequently equipped with corresponding hardware and software that are very efficient to use and, on the other hand, outputting on the smartphone screen itself is frequently very impractical while performing an agricultural activity. This specific combination may therefore make it possible to efficiently exploit the available resources and simultaneously adapt to the user's actual use. As such, in one or some embodiments, the voice input unit is a smartphone or part of the agricultural work machine, and/or the output unit is included in the control system, as part of the smartphone, or as part of the agricultural work machine. In a specific embodiment, the voice input unit is the smartphone and the output unit is a terminal of the agricultural work machine.

In one or some embodiments, the control system performs a dialog with the user via the output unit. This enables the guiding of the user using the voice input process and, if applicable, clear up mistakes or ambiguities. Specifically, the control system may pose one or more questions to the user using the output unit to reduce ambiguity, and/or errors, and/or gaps if the input is ambiguous, and/or incomplete, and/or faulty. In turn, the user may answer the questions, such as using the voice input unit. Further, in response to receiving the voice input via the voice input unit, the control system may generate additional control commands.

In one or some embodiments, a voice input unit may be configured for use in the disclosed method. Reference is made to all statements regarding the disclosed method. Specifically, a smartphone may be configured for use in the method, wherein the control commands are also transmitted by the voice input unit to a part of the control system located in the cloud. In one or some embodiments, the voice commands are translated into the control commands by the semantic model in local hardware of the voice input unit (e.g., semantic model performs the translation locally).

In one or some embodiments, an agricultural work machine with an output unit configured for use in the disclosed method is disclosed. Reference is made to all statements regarding the disclosed method.

In one or some embodiments, a computer program product is also disclosed that comprises control commands which, while being executed by a smartphone, configure the smartphone for use as the disclosed voice input unit. Reference is made to all statements regarding the disclosed voice input unit.

In one or some embodiments, a control system is disclosed for controlling a cloud-based agricultural database system configured for use in the disclosed method. Reference is made to all statements regarding the disclosed method.

In one or some embodiments, an agricultural database system configured for use in a disclosed method is disclosed. Reference is made to all statements regarding the disclosed method. The agricultural database system is configured to be controlled by the disclosed control system, wherein the state data and/or planning data depicting the agricultural context may be saved in the agricultural database system, and wherein the agricultural database system is configured such that the state data and/or planning data may be processed (e.g., supplemented such as added and/or amended by the control system).

Referring to the figures, the method and system may be configured to serve to control a cloud-based agricultural database system 1 using a control system 2 (which may be resident in the agricultural work machine 4). The agricultural database system 1, as indicated in FIG. 1, runs in the control system 2 and may operate in one embodiment only in the cloud. The control system 2 may in one embodiment be locally on-site, or also may have parts that operator or are executed in the cloud. The control system 2 may include a local voice input unit 3. Two versions 3a, 3b of this voice input unit 3 (explained further below) are shown in FIG. 1.

In the context of the disclosed method, a user B performs an agricultural activity, such as with an agricultural work machine 4 in an agricultural environment. The agricultural work machine 4 may be a tractor, a combine, a forage harvester, etc. In this regard, the agricultural activity may be an activity performed by any one of a tractor, a combine, or a forage harvester. As one example, with regard to a combine (which may include a combine header, threshing drum; etc.) any one, any combination, or all of the following may be performed: reaping; threshing; gathering; and winnowing. As another example, a tractor may provide the power and traction to perform tillage, and to tow agricultural implements (e.g., cultivator; plow; rotator; roller; etc.). For example, a forage harvester may be implements attached to a tractor or may be self-propelled. In either instance, the forage harvester may include a drum (e.g., cutterhead) or a flywheel with a number of knives. In this regard, the agricultural work machine 4 may include a variety of machinery 14 (e.g., combine header; threshing drum; cultivator; plow; rotator; roller; drum; flywheel; etc.) to perform the agricultural activity with the agricultural work machine. Examples of agricultural work machines are disclosed in U.S. Pat. Nos. 11,083,135; 11,122,739; and 9,706,697, each of which are incorporated by reference herein in their entirety. In one or some embodiments, the agricultural work machine 4 is a self-propelled harvester. The agricultural activity may be any activity that normally occurs in agriculture. Example activities may include a harvesting process that is typically performed using an agricultural work machine 4, and/or feeding livestock or servicing a silo. The agricultural environment relates to a limited agricultural functional unit such as a field, a silo, a stall, etc. that is in the proximity of the user B and relates to the agricultural activity. The agricultural environment may also include the available resources in a realistically useful proximity such as agricultural work machines 4.

The agricultural activity, and the user B, and the agricultural environment may be embedded in an agricultural context. This agricultural context may comprise a real or typical agricultural situation. The agricultural context normally includes many agricultural environments that are directly assigned to an agricultural business, a higher or lower level economic unit, or a similar connecting unit. The agricultural context determines the possible activities of the user B and in particular the agricultural activities performed by the user B.

The state data and/or the planning data depicting the agricultural context may be saved in the agricultural database system 1. The state data and planning data are therefore the virtual depiction (e.g., one or more indicators) of the real agricultural context. In one or some embodiments, the planning data relate to agricultural activities to be performed in the future such as any one, any combination, or all of: field processing; ordering; or using resources in the agricultural environment, personnel scheduling, etc. In one or some embodiments, the planning data always relate to the agricultural context in the broadest sense. In one or some embodiments, the state data depict a current situation in any one, any combination, or all of: the agricultural context; the agricultural environment; or an agricultural activity. In one or some embodiments, the state data are current, at least to a certain extent. Consequently, the planning data, at least proceeding from the state data, may depict future changes to the state data. Correspondingly, the state data and the planning data may be dependent on each other, but they may also be changed independently of each other.

The disclosed method and system relate to supporting the user B in an agricultural context. In the present case, the focus is not simply on an agricultural activity, but also on several or even all agricultural activities that arise in this agricultural context. Their organization may take a significant amount of time that is lost to other activities.

Essentially, it is disclosed that the user B processes, such as supplements such as adds and/or amends with supplemented data (e.g., supplemented state data and/or supplemented planning data), the state data and/or planning data while performing the agricultural activity by providing voice input via the local voice input unit 3. The term "process" is to be understood broadly and may include creating new data and/or modifying existing data.

The user B may, for example, create a schedule for the next day by processing the planning data and thereby assign employees, agricultural work machines 4 and other resources. Moreover, the user B may, for example, carry out or generate documentation of or related to the agriculture activity, for example by processing the state data. This gives the user B the option of integrating this planning in his daily schedule and thereby saving time.

From a technical perspective, in one embodiment, the user B speaks voice commands into the voice input unit 3 as voice input to control the agricultural database system 1. The agricultural control system 2 may then select or generate a semantic model adapted to the agricultural context on the basis of the state data and/or planning data. Using the semantic model, the agricultural control system 2 translates the voice commands into control commands, and the agricultural control system 2 uses the control commands to process the state data and/or planning data.

A "semantic model" is understood to be the basis for speech processing in the broadest sense between recording the voice commands as audio data, etc. and translating these voice commands into control commands. The semantic model may relate to the processing of the audio commands or the translation of recognized words into a technical meaning. In one or some embodiments, the semantic model is selected or generated such that it is optimized for the state data and/or planning data, and/or with the state data and/or planning data. Given this linkage between the agricultural context and technical implementation, an efficient implementation of the method may be achieved that saves data processing resources. Further, in this regard, in one or some embodiments, a plurality of semantic models may be available. In practice, a part of the system, such as the control system 2, may select one of the plurality of semantic models based on the state data and/or planning data.

In one embodiment, the control system 2 determines digital voice commands from the voice commands using voice recognition without considering the semantic model, such as using a conventional method of voice recognition, and recognizes natural speech as voice commands and translates the digital voice commands into the control commands based on the semantic model. For example, an existing speech processing system may therefore be used whose output is adapted to the needs of agriculture. Alternatively, the control system 2 is configured to determine the digital voice commands from the voice commands by speech recognition considering the semantic model and translates the digital voice commands into the control commands, such as based on the semantic model.

In one or some embodiments, the translation of the voice commands into control commands may therefore generally occur in two steps. A first step may be the correlation of the recorded audio data with a dictionary for recognizing natural language. In this instance, the semantic model may comprise a selected dictionary that, for example, at least partly contains agricultural terms, such as more than 50% agricultural terms or even predominantly agricultural terms (e.g., more than 80% agricultural terms; more than 90% agricultural terms; or more than 95% agricultural terms). Alternatively or in addition, agricultural terms may also be weighted more heavily during recognition. A second step may be recognizing meaning in which the technical control commands are derived from the recognized natural language. In this case as well, the semantic model may be used. In so doing, the words may be assigned their agricultural meaning in a technical sense. It is however also contemplated that only a single step or more than two steps is/are used in translating the speech commands into control commands.

In the embodiment shown in FIG. 1, the situation is such that the user B performs the agricultural activity using an agricultural work machine 4. The user B may perform the agricultural activity in a driver's cab 5 of the agricultural work machine 4. This allows the method and in particular speech processing to be directly harmonized with a predetermined frame of reference.

To completely and efficiently portray the agricultural context, the planning data may relate to agricultural resources, such as inventory and/or agricultural equipment (e.g., agricultural work machines 4 and/or agricultural employees and/or agricultural fields). The planning data may comprise job assignments and/or orders. In one or some embodiments, the user B processes job assignments and/or orders, such as creating or changing them. This accordingly makes it possible for the user B to undertake additional scheduling while performing under a current schedule.

With regard to the state data, in one or some embodiments, the state data relate to states of the agricultural resources and/or progress of plans from the planning data. In addition or alternatively, the state data may include documentation, such as the progress of executing a plan from the planning data, or modifying the state data. In one or some embodiments, the user B processes documentation, such as modifies the documentation.

Consequently, additional technical options for relieving the user are disclosed that synergistically interact with the disclosed method and system, and may further relieve the user B from performing manual inputs.

As shown in FIG. 1, the control system 2 automatically collects the measurement data relating to the agricultural environment and transfers the measurement data as state data into the agricultural database system 1. In this case, one or more sensors 6, such as positioned on the agricultural work machine 4, are provided for this purpose. In one or some embodiments, the control system 2 selects or generates the semantic model based on the measurement data. In one particular example, the measurement data comprises GPS data (such as GPS data from a smartphone 7, and/or GPS data from the agricultural work machine 4), and/or the state data from the agricultural work machine 4 relating to the agricultural activity.

Moreover, the measurement data may also include data from environmental recognition, such as via Bluetooth, which may be sent from the smartphone 7 and/or the agricultural work machine 4. This allows data on resources in the environment, which may be equipped with Bluetooth communication functionality, to be determined. In one or some embodiments, the control system 2 determines the position of the user B from the measurement data and correspondingly selects or generates the semantic model depending on the position. For example, a user B who is located on a certain field may consequently perform documentation of a work process planned beforehand for this field almost entirely automatically. The control system 2 may determine the position of the user B (such as via GPS data), automatically recognize the agricultural work machine 4 performing the agricultural process, and match the agricultural work machine 4 with the agricultural database system 1, derive relevant processing parameters from the sensors 6 of the agricultural work machine 4, and finalize documentation using voice input from the user B. In one or some embodiments, the control system 2 obtains the GPS data via a GPS receiver, which may be resident in (or associated with) the control system 2 or via a GPS receiver resident on smartphone 7.

It is noted at this juncture that generating the semantic model may also include parameters of other semantic models, or small changes to a semantic model. Thus, in one or some embodiments, it may be unnecessary to create or generate a new semantic model.

It is further contemplated that the control system may adapt the semantic model during the method (such as during the agricultural activity), or may select or generate another semantic model during the method.

It is also contemplated that the control system may use a plurality of semantic models. Given their abstract nature, the semantic models are not shown in FIG. 1 in the present case.

To cover many application scenarios, the control system 2 may react flexibly to the user B. Therefore, in one or some embodiments, the control system 2 may translate first voice input from the user B into control commands using a first semantic model, for the control system 2 to select or generate a second semantic model based on the control commands of the first voice input, and for additional voice input from the user B to be translated into control commands using the second semantic model.

In particular, the first semantic model may be a rough semantic model that initially recognizes whether the user B wishes, for example, to perform documentation or planning, and the second semantic model may then be adapted to this activity. For example, responsive to the control system 2 determining that the user B wishes to perform documentation, the control system 2 may select a second semantic model that is more tailored to documentation. During documentation, various measurement data from the agricultural environment considered when selecting or generating the second semantic model, and/or be transferred as state data to the agricultural database system 1 as part of the documentation. When planning, a semantic model that is independent from the agricultural environment could contrastingly be used.

To accomplish this, in one or some embodiments, the control system 2, with the first control commands, distinguishes between processing the state data and the planning data and, depending on this difference, selects the second semantic model, and the control system 2 may select or generate the second semantic model based on the measurement data while processing the state data.

In this case, the control system 2 may determine potential and/or probable processings (e.g., probable comprising a higher degree of possibility than potential so that potential encompasses all probable processings) of the state data and/or planning data from the state data and/or planning data, and/or previous processings of the state data and/or planning data, and may select or generate the semantic model, in particular, the first or the second semantic model, based on the potential and/or probable processings. This takes the circumstance into consideration that generally only a few documentations are open in an agricultural context, and only few plans make sense or are likely performed. Very basically, the selection of the semantic model may also depend on the season. For example, a user B may tend to plan sowing rather than harvesting in spring. Correspondingly, the terms probably used by the user B change.

To simplify the voice input and possibly the semantic model, it may be provided that the state data and/or planning data include forms with a set structure, and the user B processes the forms, such as filling out new forms by voice input through the local voice input unit 3 while performing the agricultural activity. In one or some embodiments, the agricultural control system 2 will select or generate the semantic model, such as the second semantic model, based on the set structure. This further reduces the burden on the user B and may simplify data processing. In particular, in one or some embodiments, the set structure is at least partially filled out automatically. In so doing, the measurement data, and/or master data of the user B, and/or the agricultural environment, and/or the agricultural context may be used.

In this case, the voice input unit 3 is a smartphone 7 or part of the agricultural work machine 4. In addition or alternatively, the control system 2 may have an output unit 8. The output unit 8 may be the smartphone 7 (e.g., the same smartphone 7 that includes voice input unit 3) or part of the agricultural work machine 4. In this case, as shown in the enlargement on the right in FIG. 1, the voice input unit 3 is the smartphone 7, and the output unit 8 is a terminal 9 of the agricultural work machine 4. In one or some embodiments, the terminal 9 includes a communication interface in order to communicate with a cloud-based agricultural database system to transmit the one or both of state data or planning data indicative of an agricultural context. This version is particularly attractive in terms of the reality of an agricultural user B. A smartphone 7 frequently contains computing resources and potentially speech processing options adapted to the user B. However, while controlling an agricultural work machine 4, outputting on the screen of the smartphone 7 is potentially hazardous. The disclosed combination of the smartphone 7 and agricultural work machine 4 solves this problem. Moreover, it may then be provided that the agricultural work machine 4 does not have a voice input unit 3, which may save costs.

Alternatively, or in addition, the control system 2 performs a dialog with the user B using the output unit 8. In one or some embodiments, the control system 2 poses questions to the user (B) via the output unit 8 to overcome ambiguity, and/or errors, and/or gaps if the input is ambiguous, and/or incomplete, and/or faulty. In this case, the user B answers questions using the voice input unit 3. In response thereto, the control system 2 thereby generates additional control commands. The control system 2 may also provide feedback to the user B if it is impossible or not recommendable to process at least a part of the data, such as to process the planning data, for example because scheduled personnel has reported sick, the weather does not fit the plan, resources are unavailable, etc.

The control system 2 may performing a documentation routine on use by the user B and may in particular generate anonymized and/or abstracted usage data. Statistics, and/or invoices, and/or a usage history may thereby be generated.

According to another aspect which is independently relevant, a voice input unit 3 configured for use in the disclosed method is also disclosed. This voice input unit 3 may comprise a smartphone 7. The control commands are also transmitted by the voice input unit 3 to a part of the control system 2 located in the cloud, with the semantic model translating the voice commands into the control commands in local hardware of the voice input unit 3. In this regard, the voice input unit 3 may include, or have access to, the semantic model that is within the local hardware (e.g., within the smartphone 7 or within other local hardware resident on the agricultural work machine 4. In principle however, all processing steps of the method may be performed independent of the particular hardware at any location. Reference is made to all statements regarding the disclosed method.

According to another teaching which is also independently relevant, an agricultural work machine 4 is disclosed which may include output unit 8 and voice input unit 3, which is configured for use in the disclosed method. In one or some embodiments, the agricultural work machine 4 is configured to perform the dialog with the user B using the output unit 8. Reference is made to all statements regarding the disclosed method.

According to another teaching which is also independently relevant, a computer program product is claimed, such as an app, that comprises control commands which, while being executed by a smartphone 7, configure the smartphone 7 for use as a voice input unit 3. Reference is made to all statements regarding the disclosed voice input unit 3.

According to another teaching which is independently relevant, a control system 2 is disclosed for controlling a cloud-based agricultural database system 1 configured for use in a disclosed method. In one or some embodiments, the control system 2 may include a local voice input unit 3, and may be configured to assist a user B who is carrying out an agricultural activity in an agricultural environment, the agricultural activity, and the user B. The agricultural environment may be embedded in an agricultural context, the state data and/or planning data depicting the agricultural context may be saved in the agricultural database system 1, the control system 2 may be configured to allow the user B to process, such as supplement and/or amend, the state data and/or planning data while performing the agricultural activity by the user B inputting his/her voice using the local voice input unit 3. In one or some embodiments, the control system 2 is at least partly cloud-based. The cloud-based part may then communicate directly or indirectly with the voice input unit 3. Reference is made to all statements regarding the disclosed method.

According to another teaching which is independently relevant, an agricultural database system 1 configured for use in the disclosed method is claimed. The agricultural database system 1 is configured to be controlled by the disclosed control system 2, wherein the state data and/or planning data depicting the agricultural context are saved in the agricultural database system 1, wherein the agricultural database system 1 is configured such that the state data and/or planning data may be processed, such as supplemented and/or amended by the control system 2. Reference is made to all statements regarding the disclosed method and the disclosed control system 2.

FIG. 1 illustrates various electronic devices with computing functionality 12, such as agricultural database system 1 and control system 2 (which may include one or both of smartphone 7 and terminal 9). Computing functionality 12 may comprise at least one processor and at least one memory, which is depicted in FIG. 1 as processor 10 (which may comprise a microprocessor, controller, PLA, or the like) and memory 11. Though the processor 10 and memory 11 are depicted as separate elements, they may be part of a single machine, which includes a microprocessor (or other type of controller) and a memory. Agricultural database system 1 may further include database memory 13 separate from memory 11 for longer-term storage. Alternatively, only one memory device may be included in agricultural database system 1.

The processor 10 and memory 11 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Further, memory 11 may have stored therein one or more apps, such as the app discussed above. The app may comprise computer executable instructions that may be stored in a computer readable medium (such as memory 11), with the computer executable instructions, when executed by at least a part of computing functionality 12 (such as executed by processor 10) cause the computing functionality 12 to perform a specified method, such as the method disclosed herein.

It is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Agricultural database system
2 Control system
3 Voice input unit
3a Voice input unit
3b Voice input unit
4 Agricultural work machine
5 Driver's cab
6 Sensor
7 Smartphone
8 Output unit
9 Terminal
10 Processor
11 Memory
12 Computing functionality
13 Database memory
14 Machinery
B User

The invention claimed is:

1. A method for controlling a cloud-based agricultural database system using at least one control system, the method comprising:
   automatically collecting measurement data indicative of performing an agricultural activity in an agricultural context using an agricultural work machine;
   automatically saving, in the cloud-based agricultural database system, one or both of state data or planning data based on the measurement data that is indicative of the agricultural context in order to generate documentation regarding the agricultural activity, wherein a user is in a driver's cab of an agricultural work machine that is performing the agricultural activity in an agricultural environment, with the agricultural activity, the user, and the agricultural environment being embedded in the agricultural context;
   outputting, on a terminal in the driver's cab of the agricultural work machine while performing the agricultural activity, one or more questions from the cloud-based agricultural database system to the user in order to solicit voice input from the user to supplement the documentation, including one or both of adding or amending to the documentation;
   responsive to the one or more questions output on the terminal, inputting, by the user and while performing the agricultural activity, the voice input via a smartphone resident in the driver's cab; and
   automatically supplementing, in the cloud-based agricultural database system, the one or both of the state data or the planning data with the voice input;
   wherein the at least one control system performs at least one of:
      automatically recognizing the agricultural work machine performing the agricultural activity in the agricultural context from one or more sensors resident on the agricultural work machine, wherein the one or more sensors resident on the agricultural work machine indicate the agricultural activity performed by the agricultural work machine; or
      automatically deriving one or more processing parameters from the one or more sensors resident on the agricultural work machine in order to generate the documentation regarding the agricultural activity.

2. The method of claim 1, wherein the user speaks one or more voice commands into the smartphone as the voice input to control at least one aspect of the agricultural database system;
   wherein the at least one control system selects or generates a semantic model adapted or configured to the agricultural context based on the one or both of the state data or the planning data;
   using the semantic model, the at least one control system translates the one or more voice commands into control commands; and
   the at least one control system uses the control commands to process the one or both of the state data or the planning data.

3. The method of claim 2, wherein the at least one control system is associated with the agricultural work machine.

4. The method of claim 1, wherein the cloud-based agricultural database system saves both state data and planning data;
wherein both the state data and the planning data are supplemented with the voice input;
wherein the planning data relate to one or more of the agricultural work machine, agricultural employees, agricultural fields, job assignments, or job orders; and
wherein the state data relate to one or more of states of agricultural resources, progress of plans from the planning data, or documentation indicative of progress of executing a plan from the planning data.

5. The method of claim 4, wherein supplementing the planning data with the voice input creates or changes one or both of job assignments or job orders; and
wherein supplementing the state data with the voice input comprising modifying the documentation to indicate a change in the progress of executing the plan.

6. The method of claim 1, wherein the at least one control system is resident in the agricultural work machine and automatically collects measurement data relating to the agricultural environment;
wherein the user speaks one or more voice commands into the smartphone as the voice input to control at least one aspect of the agricultural database system;
wherein the at least one control system selects or generates a semantic model adapted or configured to the agricultural context based on the measurement data;
using the semantic model, the at least one control system translates the one or more voice commands into control commands;
wherein the at least one control system uses the control commands to process state data in order to supplement the state data; and
wherein the at least one control system transmits the measurement data as the state data and the supplemented state data to the agricultural database system for storage.

7. The method of claim 6, wherein the at least one control system obtains GPS data from a smartphone proximate or within the agricultural work machine or from a GPS receiver on the agricultural work machine; and
wherein the at least one control system selects or generates the semantic model based on the GPS data.

8. The method of claim 2, wherein the at least one control system determines, from the one or both of the state data or planning data, potential processings of the one or both of the state data or planning data; and
wherein the at least one control system selects or generates the semantic model based on the potential processings of the one or both of the state data or planning data.

9. The method of claim 1,
wherein the at least one control system, using the terminal, poses further questions to the user in response to the at least one control system determining that the voice input that was input via the smartphone is at least one of ambiguous, incomplete, erroneous, or incomplete;
wherein, responsive to the further questions, the user provides answers via the smartphone; and
wherein the at least one control system generates additional control commands based on the answers.

10. An agricultural work machine comprising:
a driver's cab;
a terminal in the driver's cab;
machinery to perform an agricultural activity with the agricultural work machine;
a communication interface to communicate with a cloud-based agricultural database system, the agricultural database system configured to store one or both of state data or planning data indicative of an agricultural context, wherein the machinery performs the agricultural activity, with the agricultural activity, a user of the agricultural work machine, and an agricultural environment being embedded in the agricultural context; and
at least one control system in communication with the machinery and the communication interface, the at least one control system configured to:
automatically collect measurement data indicative of performing the agricultural activity in the agricultural context using the agricultural work machine;
automatically transmit the measurement data to the cloud-based agricultural database system in order for the cloud-based agricultural database system to save the one or both of state data or planning data based on the measurement data that is indicative of the agricultural context in order to generate documentation regarding the agricultural activity;
receive, from the cloud-based agricultural database system, one or more questions;
output, on the terminal in the driver's cab while the agricultural work machine performs the agricultural activity, the one or more questions from the cloud-based agricultural database system to the user in order to solicit voice input from the user to supplement the documentation, including one or both of adding or amending to the documentation;
responsive to the one or more questions output on the terminal, receive one or more voice commands as the voice input to control at least one aspect of the agricultural database system inputting, by the user and while performing the agricultural activity, the voice input via a smartphone resident in the driver's cab; and
transmit at least a part of the voice input to the cloud-based agricultural database system in order for the cloud-based agricultural database system to supplement the one or both of the state data or the planning data with the voice input,
wherein the at least one control system performs at least one of:
automatically recognizing the agricultural work machine performing the agricultural activity in the agricultural context from one or more sensors resident on the agricultural work machine, wherein the one or more sensors resident on the agricultural work machine indicate the agricultural activity performed by the agricultural work machine; or
automatically deriving one or more processing parameters from the one or more sensors resident on the agricultural work machine in order to generate the documentation regarding the agricultural activity.

11. The agricultural work machine of claim 10, wherein the agricultural work machine is in communication with the smartphone; and
wherein the smartphone including an app, when executed, to configure the smartphone to receive the voice input.

12. A cloud-based agricultural database system comprising:
an interface configured to receive one or both of state data or planning data from measurement data automatically collected by an agricultural work machine, the measurement data indicative of performing an agricultural activity in an agricultural context, wherein a user performs the agricultural activity with the agricultural work machine in an agricultural environment, with the agricultural activity, the user, and the agricultural environment are embedded in the agricultural context;

at least one memory configured to store the one or both of the state data or the planning data;

at least one processor configured to:
store in the at least one memory the one or both of the state data or the planning data in order to generate documentation regarding the agricultural activity;
transmit, to a terminal on the agricultural work machine, one or more questions for output on the terminal in a driver's cab of the agricultural work machine in order to solicit voice input from the user to supplement the documentation, including one or both of adding or amending to the documentation, the voice input being input by a smartphone resident in the driver's cab;
receive supplemented data using the voice input; and
automatically supplement the documentation with the supplemented data,
wherein at least one control system of the agricultural work machine is configured to perform at least one of:
automatically recognizing the agricultural work machine performing the agricultural activity in the agricultural context from one or more sensors resident on the agricultural work machine, wherein the one or more sensors resident on the agricultural work machine indicate the agricultural activity performed by the agricultural work machine; or
automatically deriving one or more processing parameters from the one or more sensors resident on the agricultural work machine in order to generate the documentation regarding the agricultural activity.

13. The cloud-based agricultural database system of claim 12, wherein the at least one memory is configured to save planning data and state data;
wherein the planning data is supplemented with the voice input;
wherein the state data is supplemented with the voice input;
wherein the planning data relate to one or more of the agricultural work machine, agricultural employees, agricultural fields, job assignments, or job orders; and
wherein the state data relate to one or more of states of agricultural resources, progress of plans from the planning data, or documentation indicative of progress of executing a plan from the planning data.

14. The method of claim 1, wherein the measurement data includes position data generated from a GPS receiver.

15. The method of claim 14, wherein at least one control system determines position using the position data; and
wherein the at least one control system automatically recognizes the agricultural work machine performing the agricultural activity in the agricultural context.

16. The method of claim 15, wherein the at least one control system resident on the agricultural work machine determines the position using the position data, automatically recognizes the agricultural work machine performing the agricultural activity in the agricultural context, and derives the one or more processing parameters from the one or more sensors resident on the agricultural work machine in order to generate the documentation regarding the agricultural activity.

17. The method of claim 16, wherein the documentation comprises one or more forms with a set structure; and
wherein the one or more questions to the user is to solicit the voice input regarding the one or more forms for the documentation in order for the user to fill out at least a part of the one or more forms while performing the agricultural activity.

18. The method of claim 17, wherein the one or more forms are at least partially filled out automatically; and
wherein the voice input is to fill out another part of the one or more forms.

19. The method of claim 1, wherein the smartphone uses its computing resources to perform speech processing adapted to the user.

20. The cloud-based agricultural database system of claim 12, wherein the at least one processor is configured to receive the supplemented data from the smartphone.

* * * * *